United States Patent [19]

Majewski

[11] 4,014,682
[45] Mar. 29, 1977

[54] PROCESS FOR THE PRODUCTION OF ELEMENTAL PHOSPHORUS AND IRON FROM PHOSPHATE ROCK

[75] Inventor: Edward Adam Majewski, Geelong, Australia

[73] Assignee: The Phosphate Co-operative Company of Australia Ltd., Melbourne, Australia

[22] Filed: Jan. 6, 1976

[21] Appl. No.: 646,883

Related U.S. Application Data

[63] Continuation-in-part of Ser. No. 444,242, Feb. 20, 1974, abandoned.

[30] Foreign Application Priority Data

Feb. 14, 1974 Australia ............... 65625/74

[52] U.S. Cl. .................... 75/29; 75/132; 423/107; 423/322; 423/323
[51] Int. Cl.² .................. C21B 3/04; C21B 5/04
[58] Field of Search .......... 473/317, 322, 323, 167, 473/168, 600; 75/28, 40, 96, 60, 132, 29

[56] References Cited

UNITED STATES PATENTS

| | | | |
|---|---|---|---|
| 1,115,471 | 10/1914 | Miller | 75/132 |
| 1,185,397 | 5/1916 | Greene | 75/132 |
| 1,265,076 | 5/1918 | Gray | 75/132 |
| 1,834,770 | 12/1931 | Lambert | 75/132 |
| 1,853,406 | 4/1932 | Carothers et al. | 423/600 |
| 2,117,301 | 5/1938 | Curtis et al. | 423/323 |
| 2,320,342 | 6/1943 | Bridger | 75/132 |
| 2,924,511 | 2/1960 | Reinjes et al. | 423/322 |
| 3,052,523 | 9/1962 | Loudon et al. | 423/323 |
| 3,515,515 | 6/1970 | Hianesbein | 423/322 |
| 3,699,213 | 10/1972 | Cosman et al. | 423/322 |
| 3,734,717 | 5/1973 | Segun et al. | 423/323 |
| 3,744,999 | 7/1973 | Scott et al. | 75/132 |

Primary Examiner—O. R. Vertiz
Assistant Examiner—Eugene T. Wheelock
Attorney, Agent, or Firm—Haseltine, Lake & Waters

[57] ABSTRACT

A process for the production of phosphorus from low-grade phosphate rock containing at least 5% by weight of each of iron and aluminum (calculated as their oxides) by heating a mixture of the rock, calcium oxide and a carbonaceous reductant in a reaction chamber at a temperature of at least 1400° C to produce molten reaction products containing ferrophosphorus and a calcium aluminate slag which is liquid at the reaction temperature, and gaseous reaction products containing elemental phosphorus. The gaseous reaction products are withdrawn from the reaction chamber and elemental phosphorus is recovered therefrom. The ferrophosphorus is separated from the liquid calcium aluminate slag and subjected to an oxidizing treatment in the presence of a calcium-containing material to produce metallic iron and calcium phosphate. Calcium phosphate this produced is recycled to the reaction chamber.

11 Claims, 1 Drawing Figure

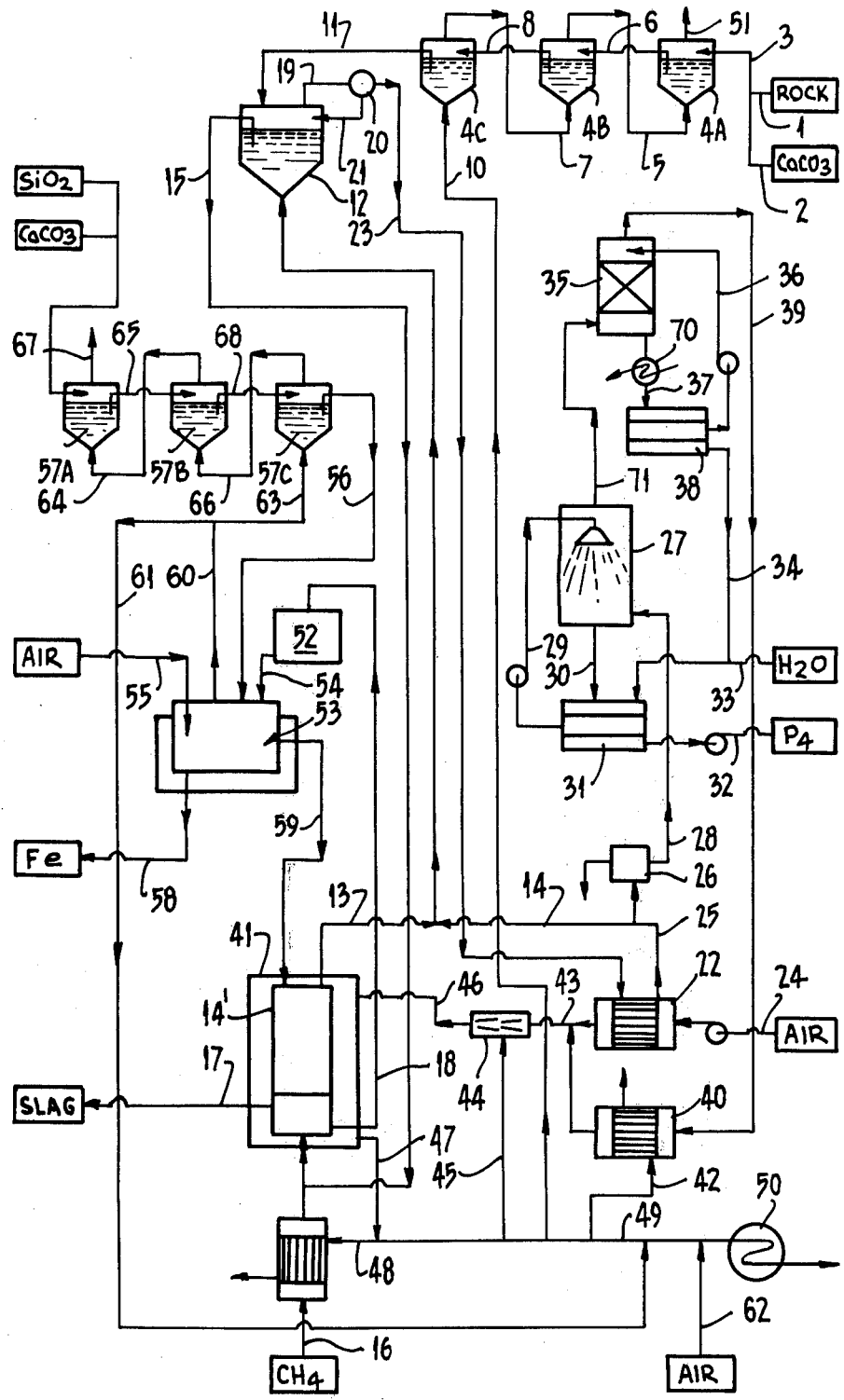

PROCESS FOR THE PRODUCTION OF ELEMENTAL PHOSPHORUS AND IRON FROM PHOSPHATE ROCK

CROSS REFERENCE TO RELATED APPLICATION

This application is a continuation in part of Ser. No. 444,242, filed Feb. 20, 1974 now abandoned.

BACKGROUND OF THE INVENTION

This invention relates to a process for the production of phosphorus from phosphate, and particularly low-grade phosphate, rock. As used throughout this specification, the term "low-grade phosphate rock" is defined to mean phosphate rock containing a total amount of at least 5% by weight of iron and at least 5% of aluminum calculated as ferric and aluminum oxides respectively, and the term "high-grade phosphate rock" to mean phosphate rock containing a total amount of less than 5% by weight of each of iron and aluminum calculated as ferric and aluminum oxides.

There are several known processes for the production of elemental phosphorus from phosphate rock and similar ores. One such process is the blast furnace technique, wherein coke is heated in a blast furnace with phosphate rock and silica to produce a molten slag and hot reaction gases. In a further known process, phosphate rock in a pulverized state is introduced to a fluidized bed in combination with a carbonaceous material such as, for example, finely divided coke. In each case, elemental phosphorous is subsequently recovered from the hot reaction gases by the use of known condensation techniques.

Phosphorus produced by either of these processes can be utilized in various ways. It is however, a problem of the superphosphate industry that the present invention is, in particular, directed towards overcoming. Reference is now made to this problem.

One problem of producing triple superphosphate involves the oxidation of elemental phosphorus to the pentoxide form, phosphoric acid in a pure state subsequently being obtained therefrom. Triple superphosphate is then formed by reaction of this phosphoric acid with calcium phosphate-rich high-grade phosphate rock. The superphosphate so produced is of good quality but the cost of production is high, due, at least partly, to the cost of high-grade rock.

In the other main process for triple superphosphate production, the so-called "wet process", calcium phosphate in high-grade phosphate rock is reacted directly with sulphuric acid to produce calcium sulphate and phosphoric acid. The phosphoric acid is then used in the production of triple superphosphate by further reaction with high-grade phosphate rock.

It has been considered for more than 150 years that low-grade phosphate rock is unsuitable for phosphoric acid production by the wet process, due to the concurrent production of undesirable amounts of aluminum and ferric hydrogen-phosphates. In low-grade phosphate rock, the higher content of ferric and aluminum oxides leads to the production of a very viscous phosphoric acid. If this acid is subsequently used to produce triple superphosphate, the product is "sticky" and of poor quality.

The discarding, as useless, of low-grade phosphate rock for the foregoing reasons is uneconomic, and wasteful of natural resources, as the phosphorus pentoxide content of such rock is frequently very high.

The use of low-grade rock in reduction processes for the production of phosphoric acid, however, reveals further problems. Most importantly, the use of low-grade rock in the hitherto known reduction processes causes technical problems due principally to the ratio of acidic to alkaline oxides in the molten reaction products.

The use of low-grade rock in reduction processes also results in the production of excessive amounts of ferro-phosphorus. Whilst some ferro-phosphorus is used commercially for example, in the iron foundry industry for the production of cast iron for fine iron lace work — the vastly increased quantities that would be produced by the widespread use of low-grade phosphate rock would not be commercially useable. Hence, a good deal of the phosphorus and iron contained in these rocks as mined would be useless. This would not only be uneconomical but would additionally present a disposal problem.

The principal object of the present invention is to provide a process for the production, from low-grade phosphate rock, of elemental phosphorus which can subsequently be used for many purposes, including those of phosphoric acid and triple superphosphate production, and which does not suffer from the above-described disadvantages. Due to the relative cheapness of mined low-grade rock per ton as compared with high-grade rock, such a process consequently allows for the production of elemental phosphorus and, eventually, tirple superphosphate far more cheaply than heretofore possible.

SUMMARY OF THE INVENTION

According to the present invention there is provided a process for the production of phosphorus from phosphate, and particularly low-grade phosphate rock, comprising the steps of heating a mixture of the phosphate rock, calcium containing material and a carbonaceous reductant in a reaction chamber at an elevated temperature, usually at least 1400° C, to produce molten reaction products containing ferro-phosphorus and a calcium-aluminate slag and gaseous reaction products containing elemental phosphorus; withdrawing the gaseous reaction products from the reaction chamber; and recovering elemental phosphorus from the gaseous reaction products; the heating being conducted other than by combustion of the reductant in the reaction chamber.

The preferred calcium-containing material is calcium oxide and this may be obtained by preheating limestone ($CaCO_3$). Limestone itself is not a desirable material for use in the reaction chamber as any carbon dioxide evolved in the reaction chamber would tend to interfere with the reduction of the phosphate rock.

Any solid, liquid or gaseous carbon-containing reductant is envisaged to be within the scope of the present invention as the carbonaceous reductant. By way of example, however, there is mentioned coal, semi-coke, char, coke, natural gas, light hydrocarbons, heavy hydrocarbons, residual oils, diesel oil and synthetic hydrocarbon-containing gases. Natural gas or residual oils are the preferred reductants for economic reasons.

As mentioned above, combustion of the reductant in the reaction chamber is to be avoided. This is because any combustion products so produced would react with further carbon, thereby reducing the amount of carbon available for the purpose of reducing the phosphate rock. Heating may be by electrical means; for instance, by electrical resistance heating of the reactants in the chamber, the phosphate rock in that case preferably being in briquette or fragmentary form. Alternatively, heating may be achieved by the combustion of a fuel outside the walls of the reaction chamber, in which case it is preferred that the rock be in a finely divided state. For this type of heating, it is particularly preferred that the rock be in a state of subdivision such that greater than 70 percent of the particles pass through a screen of 100 mesh (B.S.S.). As a further alternative, a combination of electrical and external fuel combustion heating may be employed.

To ensure efficient contact of the reactants within the reaction chamber, it is desirable to utilise fluidbed techniques in such manner as to effect fluidization or suspension of the rock where the reductant is a gaseous or vaporized liquid material or to resort to intimate blending when a solid reductant is used. When a solid reductant is employed, the reactants may be granulated, compacted or sintered. Moreover, in order to complete the the reduction, further reductant may be introduced into the molten calcium aluminate slag by means of spargers.

From an economic viewpoint, it is preferred that the hot reaction gases, after recovery of elemental phosphorus therefrom, are recycled and burnt as a fuel to heat the outside walls of the reaction chamber and/or are utilized to generate steam. It is also preferred that during recycling, the reaction gases are utilized to preheat the phosphate rock and the limestone or other source of calcium and that after being burnt as a fuel, a portion of the combustion products are utilized to preheat the carbonaceous reductant. Such preheating reduces heating costs associated with operation of the reaction chamber.

Preferably, the reaction is carried out at a temperature within the range 1500° – 2000° C, and even more preferably at about 1600° C. These temperatures facilitate formation of a highly reducing atmosphere, and in the case where a hydrocarbon reductant is employed, practically full cracking to carbon and hydrogen is achieved.

The proportions of rock and calcium oxide or like material which undergo heating in the reaction chamber will depend on the particular conditions under which the process is being operated. It is however, desirable that the amount of the calcium-containing material is such as to ensure the formation of molten reaction products at a temperature which is low enough to enable the use of standard refractories in the reaction chamber.

The molten reaction products comprise ferro-phosphorus and a calcium aluminate slag, the quantity of ferro-phosphorus being substantial owing to the relatively high iron content of low-grade phosphate rock. In order to minimize wastage, the ferro-phosphorus is separated by gravity, or in any other suitable manner, from the calcium aluminate slag, and phosphorus recovered therefrom.

The calcium aluminate slag, after being separated from the ferro-phosphorus can be put to good use in the production of heat resistant cement.

The preferred method of recovering phosphorus from the ferro-phosphorus is by means of an oxidizing treatment in the presence of calcium oxide or equivalent material to form metallic iron and calcium phosphate which is then recycled to the reaction chamber. The essential chemical reaction involved is as follows:

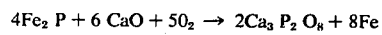

In this way there is virtually complete recovery of phosphorus.

The oxidizing treatment may be carried out by passing a stream of air, oxygen or carbon dioxide through the molten ferro-phosphorus in the presence of calcium oxide and silica or simply calcium oxide, the calcium oxide being derived from preheated limestone and the silica, when present, also being in a preheted form. The iron is separated from the resultant molten mass and the phosphates are recycled to the reaction chamber. The separated iron has magnetic properties and can be utilized in the steel industry in place of scrap iron.

BRIEF DESCRIPTION OF THE DRAWINGS

The invention will now be further described with reference to the accompanying drawings which is a flow sheet illustrating a preferred process by means of which low-grade phosphate rock may be reduced to elemental phosphorus.

The low-grade rock to be treated by this process is the C-grade rock forming the overburden layer on Christmas Island. Such rock contains approximately 28 percent phosphorus pentoxide, 13 percent ferric oxide, 13 percent calcium oxide and 28 percent aluminum oxide. To obtain one ton of phosphorus, nine tons of the phosphate rock are required. This C-grade Christmas Island rock can be mined at a cost of approximately one-fifteenth that of the mining cost of the high-grade rock at Florida, U.S.A., the cheapest source of high-grade rock at the present time.

As shown in the accompanying drawing, the phosphate rock, after being crushed to a size such that at least 70% passes a 100 mesh sieve (B.S.S.), is fed into the system via stream 1 while crushed limestone rock feed enters via stream 2. The combined feed 3 then moves to the first of a series of primary rock preheaters 4A, 4B and 4C. In the preheater 4A, the feed is fluidized by a stream of gas which enters the preheater via stream 5 at a temperature of 500° C whereby the feed is heated to 200° C and loses some moisture. The solids are then transferred to the second of the primary preheaters 4B via stream 6. Here again, the solid particles are met by hot fluidizing gas which enters the bottom of the preheater via stream 7 at 800° C. More moisture is removed and the rock, preheated to 500° C, leaves via the stream 8 and enters the third of the primary preheaters 4C. The solids entering preheater 4C are met by fluidizing waste gases at 1475° C entering the bottom of the preheater via stream 10. The remaining moisture is removed and all the limestone is decomposed.

The solids then leave preheater 4C via stream 11 at a temperature of 800° C and enter a further preheater 12 where they are met by fluidizing gas which is a mixture of a stream 13 comprising gases from the reactor to be hereinafter described and a recycle stream 14. The preheater 12 performs a preheat function in accordance with which the solids are heated from 800° C to 1000° C, and also serves to remove liquid entrainment from the reaction gases.

The heated solids leave the preheater 12 via stream 15 and enter the bottom of the reactor 14 after being fluidized and transported by preheated natural gas entering via stream 16. In the reactor, the natural gas reduces the phosphorus-containing rock to elemental phosphorus. In doing so, the natural gas is oxidized to carbon monoixde and hydrogen. These gases, which also contain phosphorus vapor, leave the reactor via stream 13 and enter the preheater 12 as referred to above. Also produced in the reactor are molten products consisting of calcium aluminate slag which leaves the reactor via stream 17 and ferro-phosphorus which leaves by stream 18, the two streams being separated by gravity.

Gases and entrained solids leave the preheater 12 via stream 19 and pass into cyclone 20 where most of the solids are separated from the stream and pass back into the preheater via pipe 21. The relatively dust-free gases at 1000° C pass to the air heater 22 via stream 23. In this preheater, heat is transferred from the phosphorus-containing gases to combustion air entering the preheater via stream 24. The phosphorus-containing gases leave the air preheater 22 via stream 25 which is split into a minor portion and a major portion. The minor portion comprises the recycle stream 14 referred to above which returns a part of the reactor gases to the preheater 12. The major portion passes to the filter 26 where most of the remaining dust is removed from the gas.

The dust-free gas, which by now has cooled to a temperature of 200° C, passes via stream 28 to the condenser 27. Phosphorus is condensed by a countercurrent stream of hot water entering the condenser via stream 29. Liquid phosphorus flows via stream 30 to the bottom of the sump 31 and is pumped away to storage via line 32.

The water demamd of the condenser 27 is met partly by fresh water entering the sump 31 via stream 33 and partly by condensed water entering via stream 34 from an absorber sump referred to below.

The wet gases which leave the condenser 27 via stream 71 enter the bottom of the absorber 35 in which they are scrubbed with a counter current spray of oleic acid at 30° C entering at the top via stream 36. Almost all of the remaining phosphorus which enters with the wet gases is dissolved by the oleic acid and this acid, plus condensed water, leaves the bottom of the tower at 55° C via line 37. This line is provided with a cooler 70 which reduces the temperature of the oleic acid to 30° C causing the phosphorus to crystallize out. The mixture in line 37 passes to the absorber sump 38 where the oleic acid separates from the mixture of phosphorus crystals and water. The water suspension is transferred to the condenser 27 by stream 34 as referred to above. The oleic acid is recycled to the top of the absorber via stream 36.

Phosphorus-free gas consisting mainly of carbon monoxide and hydrogen leaves the absorber 35 via stream 39 and enters the waste gas preheater 40° C. Here the waste gas is preheated to 985° C by a portion of the burnt waste gas from the reactor shell 41 entering the preheater via stream 42.

Air after being preheated to 670° C in the preheater 22, mixes with the preheated waste gas from preheater 40 to form stream 43 which is ignited in the ignition ejector 44. Burnt waste gas recycle also enters ejector 44 via stream 45 and mixed with the ignited gases to produce an exit stream 46 at 1800° C consisting mainly of $CO_2$ and $H_2O$. The recycle is required in order to provide a vehicle for the large heat demand of the reactor 14.

The exit stream 46 of burnt gases at 1800° C passes into the reactor shell and provides the heat necessary for the endothermic reduction reactions which take place inside the reactor. The gases leave the shell at 1475° C via stream 47.

Stream 47 divides into several streams for heating purposes. For example, stream 48 provides the necessary energy for preheating the stream 16 of natural gas to 450° C. Stream 45 is the waste gas recycle as explained above. Stream 49 provides essentially all the heat for steam raising in a waste heat boiler 50. Stream 10 is an important one as it provides all the necessary heat for preheating the rock in primary preheaters 4A, 4B and 4C as explained above.

After entering preheater 4C via stream 10, the burnt waste gases pass in turn through preheaters 4B and 4A and are finally discharged to the atmosphere. To remove as must dust as possible from the gases, the streams 5 and 7 between the preheaters and the exit stream 51 pass thriough cyclone separators while the stream 51 is also given a final filtration before discharge.

Ferro-phosphorus from the bottom of the reactor 14 is transferred to the storage tank 52 via stream 18 and then to the recovery unit 53 via stream 54. In the recovery unit, the ferro-phosphorus is subjected to an oxidizing treatment in the presence of lime and silica to produce metallic iron and calcium phosphates. Air enters the recovery unit via line 55 while a mixture of lime and silica enters via stream 56 in a preheated condition from a set of preheaters 57A, 57B and 57C.

A mixture of silca and crushed limestone rock is fed via stream 63 into preheater 57A wherein it is fluidized by a stream of gas 64 which enters the preheater from ajacent preheater 57B and heated to 200° C. The solids are then transferred to preheater 57B via stream 65. Here again, the solid particles are met by hot fluidizing gas which enters via stream 66 from preheater 57C whereby the particles are heated to 650° C. The particles then pass to preheater 57C via stream 68 wherein they are heated to 1000° C by waste gases which pass to the preheater from the recovery unit 53 via stream 63. By the time the solids leave the preheating assembly in stream 56, all water has been removed and the limestone decomposed to calcium oxide.

After leaving the preheater 57A, the gases are discharged to atmosphere in exit stream 67. To remove as must dust as possible from the gases, the streams 64 and 66 between the preheaters and the exit stream 67 pass through cyclone separators while the exit stream 67 is also given a final filtration before discharge.

A portion of the waste gases leaving the recovery unit 53 via stream 60 is directed into stream 61 which combines with stream 49 in supplying the heat requirement for steam raising. Stream 62 is cooling air which is necessary to cool the waste gases to 1200° C before they enter the waste heat boiler 50.

The metallic iron produced in the recovery unit 53 is tapped off regularly via line 58 while the calcium phosphates are fed back to the reactor 14 via line 59. In this way there is virtually complete recovery of phosphorus. The recovered iron is suitable, inter alia, for use in the steel industry in place of scrap iron.

The present process overcomes problems long known to have been associated with the use of low-grade phosphate rock and enables the production of elemental phosphorus from such rock at a reduced cost and with greater technico-economic efficiency that has hitherto been possible. As a corollary, the use of phosphorus produced by the process of the invention in the production of triple superphosphate results in a good quality product at a cost for quality figure which is also far below that hitherto possible.

It is to be understood that, in the foregoing, specific reference to particular materials and values in the various steps, features and examples is not to be considered limiting and that suitable modifications, as would be known to any person skilled in the art, are included within the spirit and scop of the present invention. For example, the wet gases which leave the condenser 27, instead of undergoing a chemical scrubbing treatment by oleic acid or other suitable chemical, could be refrigerated in order to reduce the vapor pressure of the phosphorus to a desired level.

I claim:

1. A process for the production of elemental phosphorus from low-grade phosphate rock containing at least 5% by weight of iron and at least 5% by weight aluminum calculated as ferric and aluminum oxides respectively as major impurities which comprises:
   1. mixing the low-grade phosphate rock with calcium oxide as a flux additive, the amount of calcium oxide being sufficient to produce, after the reaction of step (2), a calcium aluminate slag composition which is liquid at the reaction temperature;
   2. introducing the mixture of phosphate rock and calcium oxide simultaneously with a carbonaceous reductant into a reaction chamber and heating said mixture in said chamber at a temperature of from about 1400° C to about 1600° C, thereby to produce reaction products which are molten at said temperature and contain ferrophosphorus and said liquid calcium aluminate slag compositon and gaseous reaction products containing elemental phosphorus;
   3. withdrawing said gaseous reaction products from the reaction chamber and recovering the elemental phosphorus from gaseous reaction products;
   4. separately withdrawing said calcium aluminate slag composition and said ferrophosphorus from the reaction chamber and discarding the calcium aluminate slag composition;
   5. transferring the molten ferrophosphorus to a recovery unit;
   6. adding calcium oxide to the ferrophosphorus in the recovery unit and oxidizing the ferrophosphorus in the molten condition and in the presence of the calcium oxide, thereby to produce metallic iron and calcium phosphate;
   7. withdrawing the metallic iron and the calcium phosphate separately from the recovery unit; and
   8. recycling the calcium phosphate to the reaction chamber.

2. The process according to claim 1, wherein the oxidizing treatment in step (6) comprises the step of passing a stream of gas selected from air, oxygen and carbon dioxide through the ferrophosphorus in a molten condition in the presence of calcium oxide.

3. The process according to claim 1, wherein in step (6) silica is also present with the said calcium oxide in the ferrophosphorus oxidizing step.

4. The process according to claim 1, wherein after the gaseous reaction products in step (3) are cooled to condense phosphorus therefrom, they are then subjected to scrubbing by a chemical solvent to reduce the vapor pressure of the remaining phosphorus.

5. A process for the production of elemental phosphorus from low-grade phosphate rock containing at least 5% by weight of iron and at least 5% by weight of aluminum calculated as ferric and aluminum oxides respectively as major impurities which comprises:
   1. mixing the low-grade phosphate rock with calcium oxide as a flux additive, the amount of calcium oxide being sufficient to produce, after the reaction of step (2), a calcium aluminate slag composition which is liquid at the reaction temperature;
   2. introducing the mixure of phosphate rock and calcium oxide into a reaction chamber simultaneously with a carbonaceous reductant selected from the group consisting of coal, semi coke, char, coke, natural gas, a hydrocarbon, residual oil, diesel oil and a synthetic hydrocarbon-containing gas, and heating said mixture in said chamber at a temperature of from about 1400° C about 1600° C, thereby to produce reaction products which are molten at said temperature and contain ferrophosphorus and a liquid calcium aluminate slag composition formed by reaction between said flux and said aluminum impurity, and gaseous reaction products containing elemental phosphorus; the reaction chamber being heated externally by combustion of a fuel;
   3. withdrawing said gaseous reaction products from the reaction chamber and cooling the gaseous reaction products to condense elemental phosphorus therefrom;
   4. withdrawing said calcium aluminate slag composition and said ferrophosphorus from the reaction chamber and separating the ferrophosphorus from the calcium aluminate slag composition;
   5. oxidizing the ferrophosphorus in the presence of calcium oxide to produce metallic iron and calcium phosphate;
   6. recycling the calcium phosphate thus produced to the reaction chamber;
   7. recycling the gaseous reaction products, after the reccovery of phosphorus therefrom, to form a portion of said fuel;
   8. preheating the phosphate rock and the first said calcium oxide with the said gaseous reaction products before the recovery of phosphorus therefrom; and
   9. preheating the carbonaceous reductant by the products resulting from the combustion of said fuel.

6. The process according to claim 5, wherein silica is also present with the calcium oxide containing material in the ferrophosphorus oxidizing step.

7. The process according to claim 5, wherein the gaseous reaction products, after the phosphorus has been condensed therefrom, are scrubbed by a chemical solvent to reduce the vapor pressure of the remaining phosphorus.

8. The process according to claim 5, wherin the gaseous reaction products, after the phosphorus has been condensed therefrom, are refrigerated to reduce the vapor pressure of the remaining phosphorus.

9. The process according to claim 5, wherein heating of the reaction chamber is effected electrically.

10. The process according to claim 5, wherein further reductant is introduced into the calcium aluminate slag by sparging.

11. A process according to claim 5, wherein heating of the reaction chamber is effected externally by combustion of a fuel.

* * * * *

UNITED STATES PATENT OFFICE
CERTIFICATE OF CORRECTION

Patent No. 4,014,682   Dated  March 29, 1977

Inventor(s) Edward Adam Majewski et al.

It is certified that error appears in the above-identified patent and that said Letters Patent are hereby corrected as shown below:

In the heading, "Claims priority, application Australia, February 14, 1974, 65625/74" should read --Claims priority, application Australia, February 21, 1973, 2346/73--.

Signed and Sealed this

Twenty-fifth Day of October 1977

[SEAL]

Attest:

RUTH C. MASON
Attesting Officer

LUTRELLE F. PARKER
Acting Commissioner of Patents and Trademarks